(12) United States Patent
Marashi et al.

(10) Patent No.: US 12,085,056 B2
(45) Date of Patent: Sep. 10, 2024

(54) WIND TURBINE BLADE WITH IMPROVED ADHESIVE JOINT BETWEEN SHEAR WEB AND SHELL

(71) Applicant: Vestas Wind Systems A/S, Aarhus N. (DK)

(72) Inventors: Houriyeh Marashi, Risskov (DK); Stephen Sandercock, Ryde (GB)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 18/252,374

(22) PCT Filed: Nov. 10, 2021

(86) PCT No.: PCT/DK2021/050329
§ 371 (c)(1),
(2) Date: May 10, 2023

(87) PCT Pub. No.: WO2022/100803
PCT Pub. Date: May 19, 2022

(65) Prior Publication Data
US 2024/0011464 A1 Jan. 11, 2024

(30) Foreign Application Priority Data
Nov. 12, 2020 (DK) .......................... PA 2020 70749

(51) Int. Cl.
*F03D 1/06* (2006.01)
*B29C 65/00* (2006.01)
*B29L 31/08* (2006.01)

(52) U.S. Cl.
CPC .......... *F03D 1/0684* (2023.08); *B29C 66/131* (2013.01); *B29C 66/5414* (2013.01);
(Continued)

(58) Field of Classification Search
CPC .... F03D 1/0675; F03D 1/0679; F03D 1/0681; F03D 1/0684; F05B 2240/301
See application file for complete search history.

(56) References Cited

U.S. PATENT DOCUMENTS 9,506,452 B2 * 11/2016 Bakhuis .................. F03D 13/10
2011/0142663 A1 * 6/2011 Gill ....................... F03D 1/0675
156/60
(Continued)

FOREIGN PATENT DOCUMENTS

CN 202273817 U 6/2012
CN 107061446 A 8/2017
(Continued)

OTHER PUBLICATIONS

International Searching Authority, International Search Report and Written Opinion issued in corresponding PCT Application No. PCT/DK2021/050329, mailedFeb. 14, 2022.
(Continued)

*Primary Examiner* — Sabbir Hasan
*Assistant Examiner* — Andrew J Marien
(74) *Attorney, Agent, or Firm* — Wood Herron & Evans LLP (57) ABSTRACT

In a first aspect of the invention there is provided a wind turbine blade comprising a shell and a shear web connected between a windward inner surface of the shell and a leeward inner surface of the shell. The shear web comprises an elongate web panel and a load-bearing flange extending transversely from a first side of the web panel to connect the shear web to the windward or leeward inner surface of the shell. The blade further comprises at least one non-structural flange extending transversely from a second side of the web panel. The non-structural flange has a substantially planar adhesive-receiving portion arranged in opposed relation to the windward or leeward inner surface of the shell. The
(Continued)

load-bearing flange and the non-structural flange are formed of different materials.

14 Claims, 7 Drawing Sheets

(52) U.S. Cl.
CPC .......... *B29C 66/721* (2013.01); *F03D 1/0675* (2013.01); *F03D 1/0679* (2023.08); *F03D 1/0681* (2023.08); *B29L 2031/085* (2013.01); *F05B 2230/23* (2013.01); *F05B 2240/2211* (2013.01); *F05B 2240/301* (2013.01); *F05B 2280/00* (2013.01)

(56) References Cited

U.S. PATENT DOCUMENTS

| | | | |
|---|---|---|---|
| 2012/0027612 A1* | 2/2012 | Yarbrough | F03D 1/0675 416/226 |
| 2014/0064980 A1* | 3/2014 | Griesel | F03D 1/0675 156/305 |
| 2014/0294591 A1* | 10/2014 | Liu | F16B 11/008 156/293 |
| 2016/0009907 A1* | 1/2016 | Naito | C08L 7/00 524/526 |
| 2017/0211543 A1* | 7/2017 | Sandercock | B29C 70/76 |
| 2018/0283349 A1 | 10/2018 | Wardropper et al. | |

FOREIGN PATENT DOCUMENTS

| | | |
|---|---|---|
| CN | 212386044 U | 1/2021 |
| EP | 2843227 A1 | 3/2015 |
| EP | 2931498 A1 | 10/2015 |
| WO | 2013086667 A1 | 6/2013 |
| WO | 2014086703 A1 | 6/2014 |
| WO | 2020114564 A1 | 6/2020 |
| WO | 2020125902 A1 | 6/2020 |
| WO | 2020125903 A1 | 6/2020 |

OTHER PUBLICATIONS

Danish Patent and Trademark Office, examination report issued in corresponding DK Application No. PA 2020 70749, mailed May 10, 2021.

* cited by examiner

WIND TURBINE BLADE WITH IMPROVED ADHESIVE JOINT BETWEEN SHEAR WEB AND SHELL

TECHNICAL FIELD

The present invention relates generally to wind turbines and more specifically to wind turbine blades.

BACKGROUND

Modern wind turbine blades typically comprise a shell defining the aerodynamic contour of the blade and one or more longitudinally-extending spars which act as the main load-bearing structures of the blade. A spar typically comprises a shear web which is configured to take up the shear loads experienced by the wind turbine blade in use. The shear web may comprise upper and lower flanges via which the web is adhesively bonded to the inner surfaces of the shell. The flanges may extend from a web panel such that the shear web is substantially C-shaped in cross section.

After manufacture, wind turbine blades may routinely be inspected from the outside of the shell using non-destructive testing (NDT) methods. Such testing may for example involve emitting ultrasonic or other high-frequency signals through the blade shell and measuring reflected signals to build up an image of the arrangement of materials in the shell and within the blade. The ultrasonic signals are reflected at the boundary between a material and a less dense material, such as air. NDT methods may be used to determine the position of the shear web within the shell, and/or to assess the joint between the shear web and shell.

However, in some cases, measuring these criteria using NDT methods can be challenging. For example, surplus adhesive from between the upper flange and the shell may land on the lower inner surface of the shell on or near to the lower flange, and such adhesive may interfere with the NDT testing of the lower shell. Further, if adhesive is squeezed from between the upper flange and shell, this may result in insufficient adhesive remaining to thoroughly bond the web to the shell. This is a particular issue with C-shaped shear webs where a lack of adhesive near a heel portion of the web may restrict effective load transfer between the shell and web panel. In addition, if there is a lack of adhesive near a heel portion of the web, NDT signals may be not be reflected as expected to facilitate conclusive readings from the NDT machine.

It is against this background that the present invention has been developed.

SUMMARY OF INVENTION

In a first aspect of the invention there is provided a wind turbine blade comprising a shell and a shear web connected between a windward inner surface of the shell and a leeward inner surface of the shell. The shear web comprises an elongate web panel and a load-bearing flange extending transversely from a first side of the web panel to connect the shear web to the windward or leeward inner surface of the shell. The blade further comprises at least one non-structural flange extending transversely from a second side of the web panel. The non-structural flange has a substantially planar adhesive-receiving portion arranged in opposed relation to the windward or leeward inner surface of the shell. The load-bearing flange and the non-structural flange are formed of different materials.

The load-bearing flange may comprise reinforcing fibres. Preferably the load-bearing flange is formed of a fibre reinforced polymer material. The load-bearing flange may be formed of glass fibre reinforced plastic (GFRP).

The non-structural flange may not comprise reinforcing fibres. The non-structural flange may be formed of a non-reinforced polymer material. Preferably, the non-structural flange is formed in a plastic extrusion process.

The adhesive-receiving portion of the non-structural flange may have a width of at least 12.5 mm. Preferably, the adhesive-receiving portion has a width of at least 25 mm. More preferably still, the adhesive-receiving portion may have a width of at least 30 mm.

A proximal end of the non-structural flange may be connected to the web panel. The non-structural flange may comprise a distal flange tip that tapers in thickness. The non-structural flange may comprise a distal flange tip that is inclined relative to the adhesive-receiving portion. Preferably the distal flange tip is inclined towards the opposed windward or leeward inner surface of the shell.

The load-bearing flange may be integral with the web panel. The non-structural flange may be non-integral with the web panel.

The non-structural flange may be at least partially transparent or translucent.

The adhesive-receiving portion of the non-structural flange may be spaced apart from the windward or leeward inner surface of the shell by a greater distance than a distance between the load-bearing flange and the same windward or leeward inner surface of the shell.

The adhesive-receiving portion of the non-structural flange may be substantially co-planar with the load-bearing flange.

The non-structural flange may be formed of a substantially flexible material. Preferably the non-structural flange is formed of a material having an elastic modulus of less than 10 GPa, more preferably less than 5 GPa, and most preferably less than 2.5 GPa. Preferably, the adhesive-receiving portion of the non-structural flange can pivot relative to the web panel during manufacture of the blade.

A cross-sectional profile of the non-structural flange may vary along the length of the shear web. The cross-sectional profile of the non-structural flange may vary in a stepwise manner along the length of the shear web.

The non-structural flange may be formed of a plurality of longitudinal flange sections arranged end to end along the length of the shear web. Each non-structural flange section may comprise a cross-sectional profile that is substantially constant along its respective longitudinal axis. At least two longitudinally adjacent flange sections may comprise different cross-sectional profiles.

The wind turbine blade may comprise a first non-structural flange having a substantially planar adhesive-receiving portion arranged in opposed relation to the windward inner surface of the shell, and may further comprise a second non-structural flange having a substantially planar adhesive-receiving portion arranged in opposed relation to the leeward inner surface of the shell. The adhesive-receiving portions of the first and second non-structural flanges may extend transversely from a shared flange stem. The non-structural flanges may be connected to the shear web via the shared flange stem.

BRIEF DESCRIPTION OF FIGURES

Embodiments of the present invention will now be described by way of non-limiting example only, with reference to the accompanying figures, in which.

DETAILED DESCRIPTION

Figure 1:
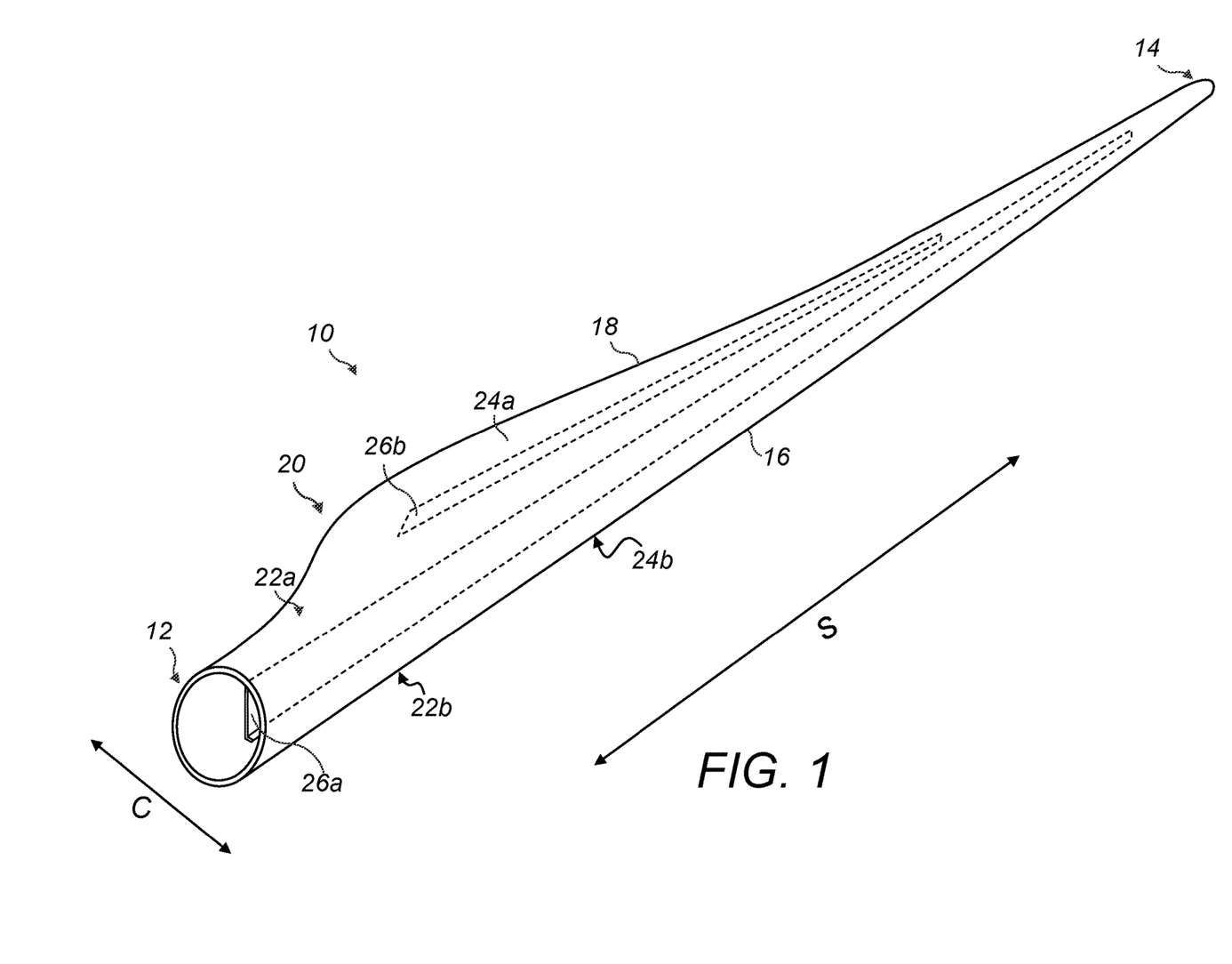
FIG. 1 is a schematic perspective view of a wind turbine blade comprising an outer shell and shear webs arranged inside the shell.

FIG. 1 is a schematic perspective view of a wind turbine blade 10. The blade 10 extends in a spanwise direction (S) between a root end 12 and a tip end 14, and in a chordwise direction (C) between a leading edge 16 and a trailing edge 18. The blade 10 comprises an outer shell 20 which may be formed of a first half shell 22a, and a second half shell 22b joined together. In the example shown in FIG. 1, the first half shell 22a defines a windward side 24a of the blade 10, and the second half shell 22b defines a leeward side 24b of the blade 10.

The blade 10 further comprises a shear web 26 which extends longitudinally in the spanwise direction (S) inside the shell 20 and forms part of a reinforcing spar structure. The shear web 26 helps to absorb structural loads, in particular shear loads, experienced by the wind turbine blade 10 in use. The blade 10 may comprise a plurality of shear webs 26, such as a main shear web 26a and a trailing edge shear web 26b. The shear webs 26 are shown more clearly in the cross-sectional view in FIG. 2a.

Figures 2A, 2B:
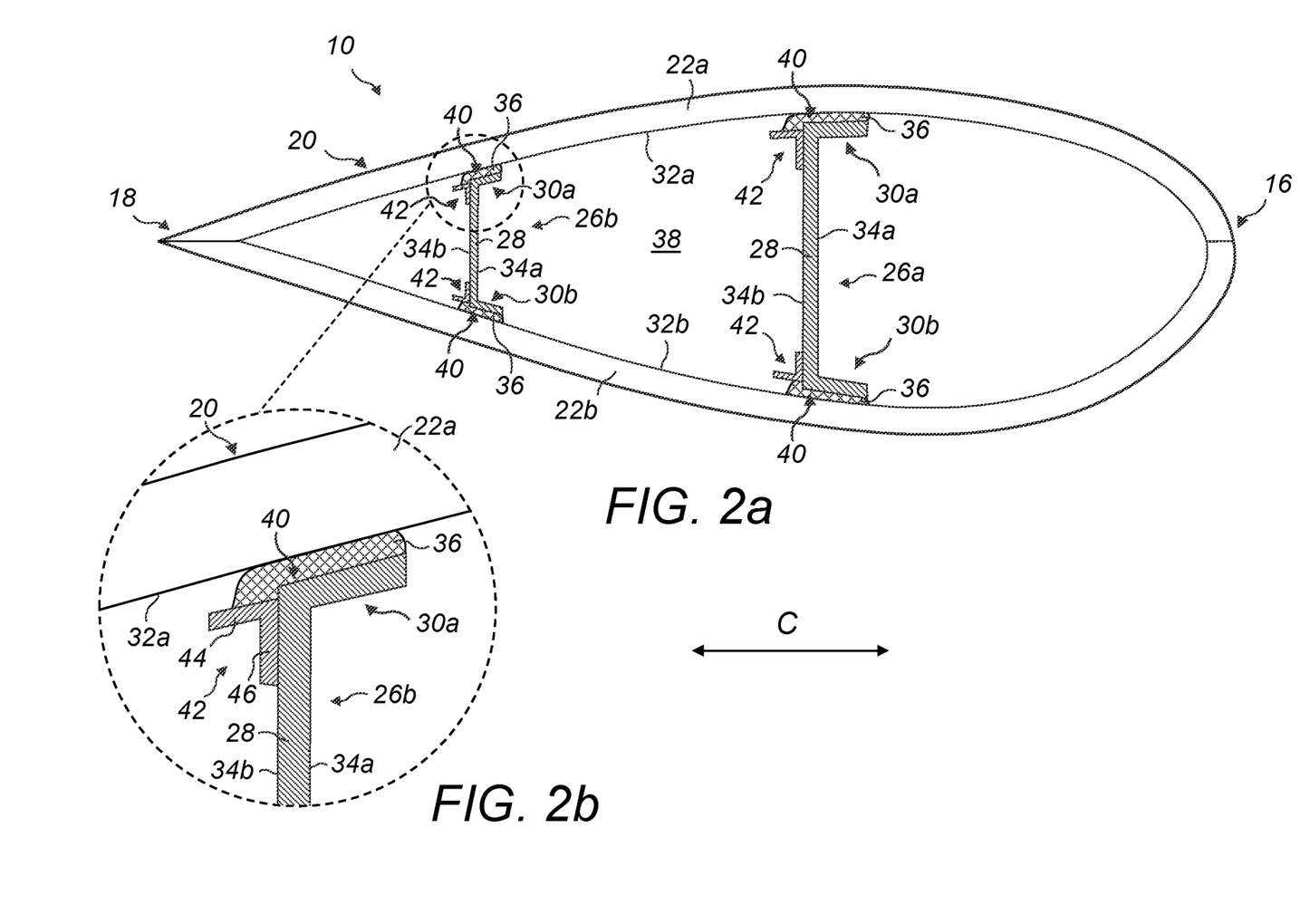
FIG. 2a is a schematic cross-sectional view of the wind turbine blade showing a plurality of non-structural flanges connected to the shear webs.
FIG. 2b is an enlarged view of an upper load-bearing flange of the shear web and a non-structural flange.

Referring now to FIG. 2a, the shear webs 26 each comprise an elongate web panel 28 that extends between load-bearing flanges 30 for connecting the shear web 26 to inner surfaces 32 of the shell 20. For example, the shear web 26 may comprise a first load-bearing flange 30a for connecting the web 26 to a windward inner surface 32a of the shell 20, and a second load-bearing flange 30b for connecting the shear web 26 to a leeward inner surface 32b of the shell 20. The load-bearing flanges 30a, 30b extend transversely from a first side 34a of the web panel 28. As such, the shear webs 26 may have a substantially C-shaped cross-sectional profile. It will be appreciated that references made herein to a shear web 26 apply equally to both a main shear web 26a and a trailing edge shear web 26b.

Each load-bearing flange 30 is a structural component configured to transfer shear loads between the shell 20 and the shear web panel 28. As such, the load-bearing flange 30 may comprise reinforcing fibres such as glass fibres or carbon fibres to facilitate effective load transfer. Preferably, the reinforcing fibres in the load-bearing flanges 30 are predominantly oriented at an offset angle (such as at +/−45 degrees) to a longitudinal axis of the shear web 26. The load-bearing flange 30 may therefore transfer shear loads effectively without substantially taking up bending loads experienced by the blade 10.

The load-bearing flanges 30 may, for example, comprise biaxial fibrous reinforcing material in a polymer resin matrix. In some examples, the load-bearing flanges 30 may be integral with the web panel 28. For example, the shear web 26 may be formed in a composite moulding process wherein the web panel 28 and fibrous reinforcing material for the load-bearing flanges 30 are integrated with resin to form a shear web 26 with integral load-bearing flanges 30.

The shear web 26 is connected to the shell 20 by adhesive 36 which bonds the load-bearing web flanges 30a, 30b to the respective inner surfaces 32a, 32b of the shell 20, i.e. to the windward and leeward inner surfaces. The shear webs 26 are bonded to the inner surfaces 32a, 32b of the shell 20 during manufacture of the blade 10 as will now be described briefly with reference still to FIG. 2a.

Manufacturing the wind turbine blade 10 may involve forming the first and second half shells 22a, 22b separately. Each half shell 22 may be formed in a composite manufacturing method, such as vacuum assisted resin transfer moulding (VARTM) for example. Once formed, the half shells 22a, 22b may be joined together in a join-up process to form the complete outer shell 20. The join-up process typically involves arranging the half shells 22a, 22b on top of one another to form an outer shell 20 with a substantially hollow interior 38. For example, the windward half shell 22a may be arranged on top of the leeward half shell 22b and the two shells may be bonded together with adhesive applied along the leading and trailing edges 16, 18.

During the join-up process, one or more shear webs 26 may be arranged between the half shells 22a, 22b and connected between respective inner surfaces 32a, 32b, for example by adhesive 36. In some examples, the or each shear web 26 is arranged in the lower of the two half shells 22, and adhesive 36 is arranged between a lower load-bearing web flange 30b and the inner surface 32b of the shell 22b. Adhesive 36 is also arranged such that, when the half shells 22a, 22b are joined together, an upper load-bearing web flange 30a is connected to the inner surface 32a of the upper half shell 22a. For example, adhesive 36 may be arranged on the upper load-bearing flange 30a and/or on the inner surface 32a of the upper half shell 22a before the complete outer shell 20 is formed and the shear web 26 is sandwiched between the half shells 22.

Preferably, the adhesive 36 arranged between the load-bearing flanges 30 and inner surfaces 32 of the shell 20 extends across the full width of the flange 30. In particular, the adhesive 36 should preferably bond a heel portion 40 of the shear web 26, where the load-bearing flange 30 meets the web panel 28, to the inner surface 32 of the shell 20. Bonding the heel portion 40 to the shell 20 facilitates optimal load transfer by minimising the length of the load path between the shell 20 and web panel 28. In some examples this may involve bonding an edge of the web panel 28 to the inner surface 32 of the shell 20. In other examples this may involve bonding a proximal edge of the load-bearing flange 30, the edge closest to the web panel 28, to the inner surface 32 of the shell 20.

However, in examples where a blade 10 comprises a C-shaped web, the bonding process can introduce complications as described by way of background above. With reference briefly to the upper load-bearing flange 30a, if adhesive 36 is squeezed from between the upper load-bearing flange 30a and the shell 22a, this surplus adhesive may fall and land on the inner surface 32b of the lower shell 22b. This may result in interference with non-destructive testing signals when inspecting the finished blade 10, leading to incomplete or unreliable inspection data. Adhesive 36 may also slide down from between the load-bearing flange 30a and the shell 22a before curing. This may lead to a situation where the heel portion 40 is not thoroughly bonded to the shell 20 because the adhesive 36 is no longer present between the heel portion 40 and the inner surface 32a of the shell 22a. Further, the surplus squeezed adhesive 36 may come loose inside the blade 10 during use. Such loose adhesive may cause additional noise by moving around in the blade 10 in use, and could potentially damage the blade interior and/or subcomponents within the blade 10.

In order to overcome at least some of the above-described challenges, wind turbine blades 10 in accordance with the present invention comprise a non-structural flange 42 extending transversely from a second side 34b of the web panel 28 as will now be described with reference to the remaining figures. In some examples, the wind turbine blade 10 may comprise non-structural flanges 42 arranged in opposed relation to both the windward and leeward inner surfaces 32a, 32b of the shell 20, as shown in FIG. 2a.

With reference now to FIGS. 2a and 2b, each non-structural flange 42 is configured to receive excess adhesive 36 squeezed from between the shear web 26 and the respective windward or leeward inner surface 32a, 32b of the shell 20 during manufacture of the blade 10. As such, the non-structural flange 42 comprises an adhesive-receiving portion 44 arranged in opposed relation to the respective inner surface 32 of the shell 20. The adhesive-receiving portion 44 provides a surface to which any surplus squeezed adhesive 36 can adhere. For example, if the windward inner surface 32a is an upper inner surface during the join-up process, the non-structural flange 42 catches any adhesive 36 squeezed from between the windward inner surface 32a and the upper load-bearing flange 30a. The non-structural flange 42 therefore ensures that surplus adhesive 36 does not fall onto the leeward inner surface 32b.

Preferably, the adhesive 36 used to bond the shear web 26 to the shell 20 is sufficiently viscous that the provision of the adhesive-receiving portion 44 stops adhesive 36 from dropping out from between the web heel 40 and the shell 20. Notably, the provision of a non-structural flange 42 makes it possible to apply more adhesive 36 than should be necessary to bond the load-bearing flanges 30 to the shell 20, without the disadvantages of surplus squeezed adhesive 36 described previously. Applying excess adhesive 36 means that the adhesive bondline can be compressed during the join-up process, spreading the adhesive 36 in a generally chordwise direction (C) and ensuring that substantially the entire flange 30, including the heel portion 40 of the web 26, is thoroughly bonded to the inner surface 32 of the shell 20.

The adhesive-receiving portion 44 is substantially planar and provides a substantially flat surface with which to reflect non-destructive testing signals, which in this example are ultrasonic testing signals. The flat surface ensures that non-destructive testing signals emitted towards the blade interior 38 from outside of the shell 20 are reflected back in substantially the same direction from which they are emitted. By reducing the deviation in direction between emitted signals and their corresponding reflected signals (echoes), the NDT apparatus is able to capture more returned signals and the collected data is therefore clearer and more reliable.

The width of the adhesive-receiving portion 44 is preferably selected in accordance with the resolution of the non-destructive testing apparatus. In some examples, the planar adhesive-receiving portion 44 of the non-structural flange 42 has a width of at least 12.5 mm. This corresponds to a measured region that is represented by one pixel in the image produced by typical NDT apparatus such as the FORCE Technology AMS-71 blade array scanner. Configuring the width of the adhesive-receiving portion 44 in accordance with the resolution of the testing apparatus ensures that the reflected signals are represented in the collected testing data, resulting in an accurate and reliable image. A width of 12.5 mm also ensures that there is a sufficient area on which to receive any surplus adhesive 36. Most preferably, the adhesive-receiving portion 44 is 30 mm in width, corresponding to more than two pixels in the resultant data output by the NDT apparatus.

The adhesive-receiving portion 44 of the non-structural flange 42 may be substantially parallel to the inner surface 32 of the shell 20 with which it is arranged, in some examples. This ensures that NDT signals directed into the blade 10 from outside the shell 20 reflect off a substantially flat surface and return to the testing apparatus with very little deviation. The orientation of the inner surface 32 of the shell 20 may vary relative to the shear web panel 28 along its length due to the complex aerodynamic profile of the shell 20. The inclination of the adhesive-receiving portion 44 of the non-structural flange 42 may therefore also vary relative to the shear web panel 28 in order to maintain a substantially constant separation between the adhesive-receiving portion 44 and the inner surface 32 of the shell 20.

The shear web 26 is designed with a distance between the load-bearing flanges 30a, 30b that is slightly less than a distance between the corresponding inner surfaces 32a, 32b of the shell 20 after the half shells 22a, 22b are joined together to form the outer shell 20. The shear web 26 is therefore configured to leave space for an adhesive bondline of a given thickness, such as 5 mm for example, between the load-bearing flanges 30 and the inner surfaces 32 of the shell 20. In some examples, the adhesive-receiving 44 is spaced apart from the inner surface 32 of the shell 20 by a greater distance than the load-bearing flange 30. The increased separation between the non-structural flange 42 and the shell 20 reduces the risk of clashes or contact between said flange 42 and the inner surface 32 of the shell 20 during the join-up process. The increased separation also provides a greater volume within which to receive surplus squeezed adhesive 36.

The non-structural flange 42 may be substantially L-shaped in cross section, as shown for example in FIGS. 2a and 2b. Accordingly, in some examples the non-structural flange 42 comprises a flange stem 46 which extends transversely from the adhesive-receiving portion 44. The non-structural flange 42 is preferably non-integral with the shear web panel 28, i.e. the non-structural flange 42 is preferably a separately-formed part that is connected to the shear web 26. The non-structural flange 42 may be connected to the shear web 26 via the flange stem 46. The non-structural flange 42 may for example be connected to the shear web 26 by adhesive. As such, the flange stem 46 may be bonded to the second side 34b of the web panel 28. Alternatively or additionally, the non-structural flange 42 may be connected to the shear web 26 by mechanical fastening means such as a bolted connected. As such, the flange stem 46 and web panel 28 may comprise holes (not shown) to receive a bolt.

The non-structural flange 42 is specifically designed not to transfer loads between the shell 20 and the shear web 26. As such, the non-structural flange 42 is made from a different material to the material from which the load-bearing flange 30 is made. Preferably, the non-structural flange 42 does not comprise reinforcing fibres and therefore does not take up any loads that the load-bearing flange 30 is specifically configured to transfer. The non-structural flange 42 may for example be formed of a polymer material, preferably a non-reinforced polymer material, such as Acrylonitrile Butadiene Styrene (ABS). Accordingly, cost-effective manufacturing processes with high repeatability, such as extrusion or injection moulding, may be used to form the non-structural flange 42.

In some examples, the non-structural flange 42 is formed of a sufficiently flexible material to allow the adhesive-receiving portion 44 to pivot relative to the shear web panel 28 during manufacture of the blade 10. As such, the adhesive-receiving portion 44 may simply deflect if the non-structural flange 42 does for some reason contact the shell 20 during the join-up process. Any contact between the non-structural flange 42 and shell 20 therefore does not cause the shear web 26 to be moved out of position because the adhesive-receiving portion 44 can simply deflect upon contact. Further, the flexibility of the non-structural flange 42 ensures that the flange does not get damaged in the event of contact with the shell 20. Preferably, in examples where the non-structural flange 42 is sufficiently flexible, it is formed of a material having a Young's modulus of less than 10 GPa.

In some examples, the geometry of the corner between the adhesive-receiving portion 44 and the flange stem 46 may be configured specifically to act as a hinge in order to allow the adhesive-receiving portion 44 to pivot relative to the flange stem 46. For example, the radius of the corner between the adhesive-receiving portion 44 and stem 46, and the thickness of the flange 42, may be configured such that the corner has increased flexibility relative to the stem 46 and/or adhesive receiving portion 44. As such, any contact between the non-structural flange 42 and shell 20 would cause the adhesive-receiving portion 44 to pivot about the corner in such an example.

In some examples, the cross-sectional profile of the non-structural flange 42 may be adapted to provide a number of additional benefits as will now be described with reference to the remaining figures.

Figure 3:
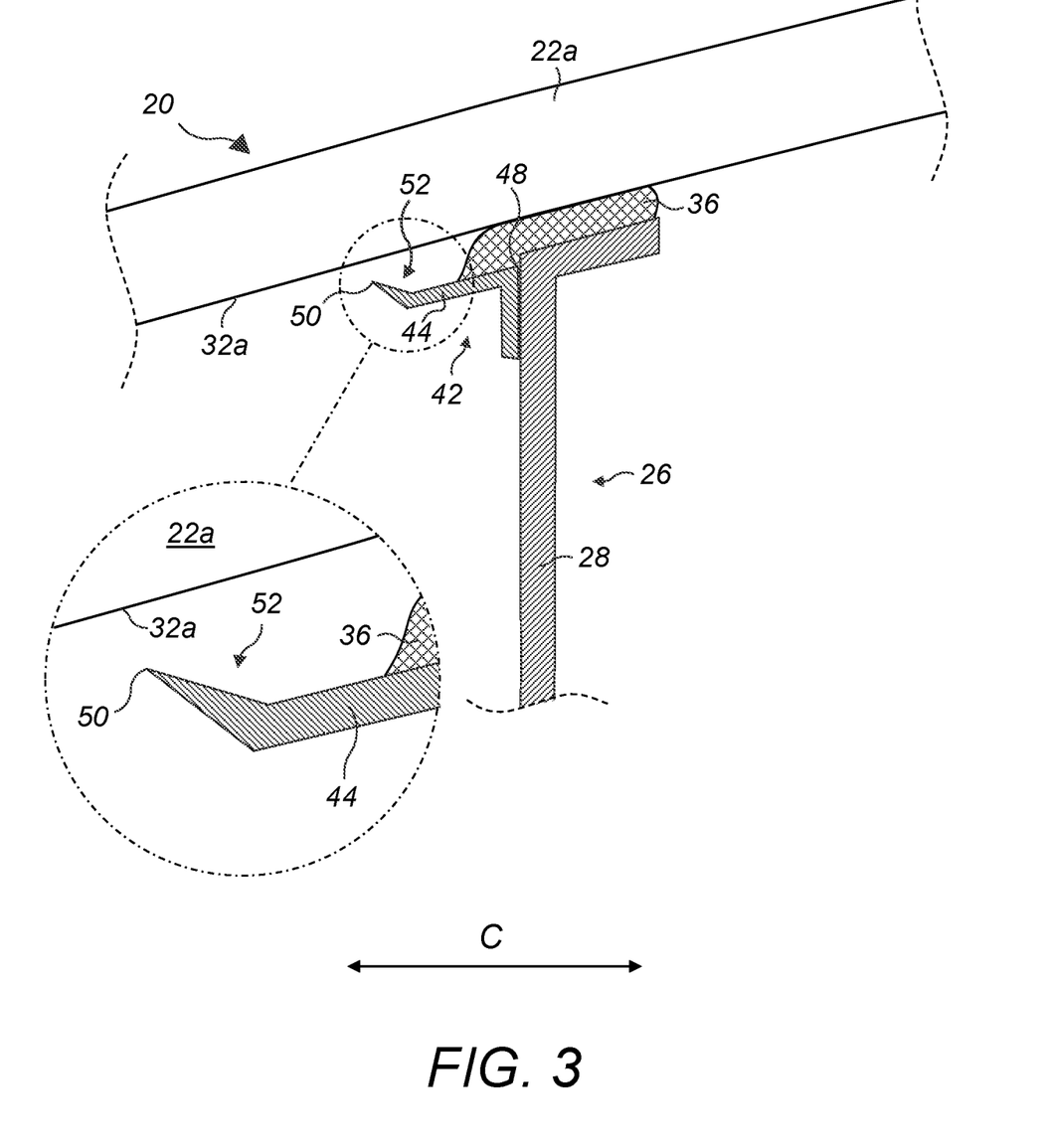
FIG. 3 is a schematic cross-sectional view showing a non-structural flange with an inclined distal flange tip.

With reference to FIG. 3, proximal and distal edges 48, 50 of the non-structural flange 42 are defined in relation to their proximity to the shear web panel 28. For example, the proximal edge 48 of the non-structural flange 42 may be connected to the shear web panel 28 or may at least be in contact with the web panel 28. The distal edge 50 of the non-structural flange 42 may be a "free end" or "unsupported end" in some examples, as shown in FIG. 3.

The distal edge 50 of the non-structural flange 42 may be defined by a distal flange tip 52. As shown in FIG. 3, the distal flange tip 52 may be inclined relative to the adhesive-receiving portion 44 in some examples. An inclined distal flange tip 52 may help to contain the surplus squeezed adhesive 36 on the adhesive-receiving portion 44 by providing a barrier to stop adhesive from sliding off the non-structural flange 42. An inclined distal flange tip 52 may be particularly advantageous in examples where the adhesive-receiving portion 44 is oriented at less than 90° (degrees) to the shear web panel 28, such as along the trailing edge shear web 26b for example.

Any potential contact between the non-structural flange 42 and the shell 20 during the join-up process is most likely to occur at the distal edge 50. In some examples, the distal flange tip 52 may therefore additionally or alternatively taper in thickness towards the distal edge 50. Tapering the thickness of the distal flange tip 52 increases its flexibility and facilitates deflection of the tip 52 upon potential contact with the shell 20 without damaging the flange 42 or moving the shear web 26 within the shell 20.

Figure 4:
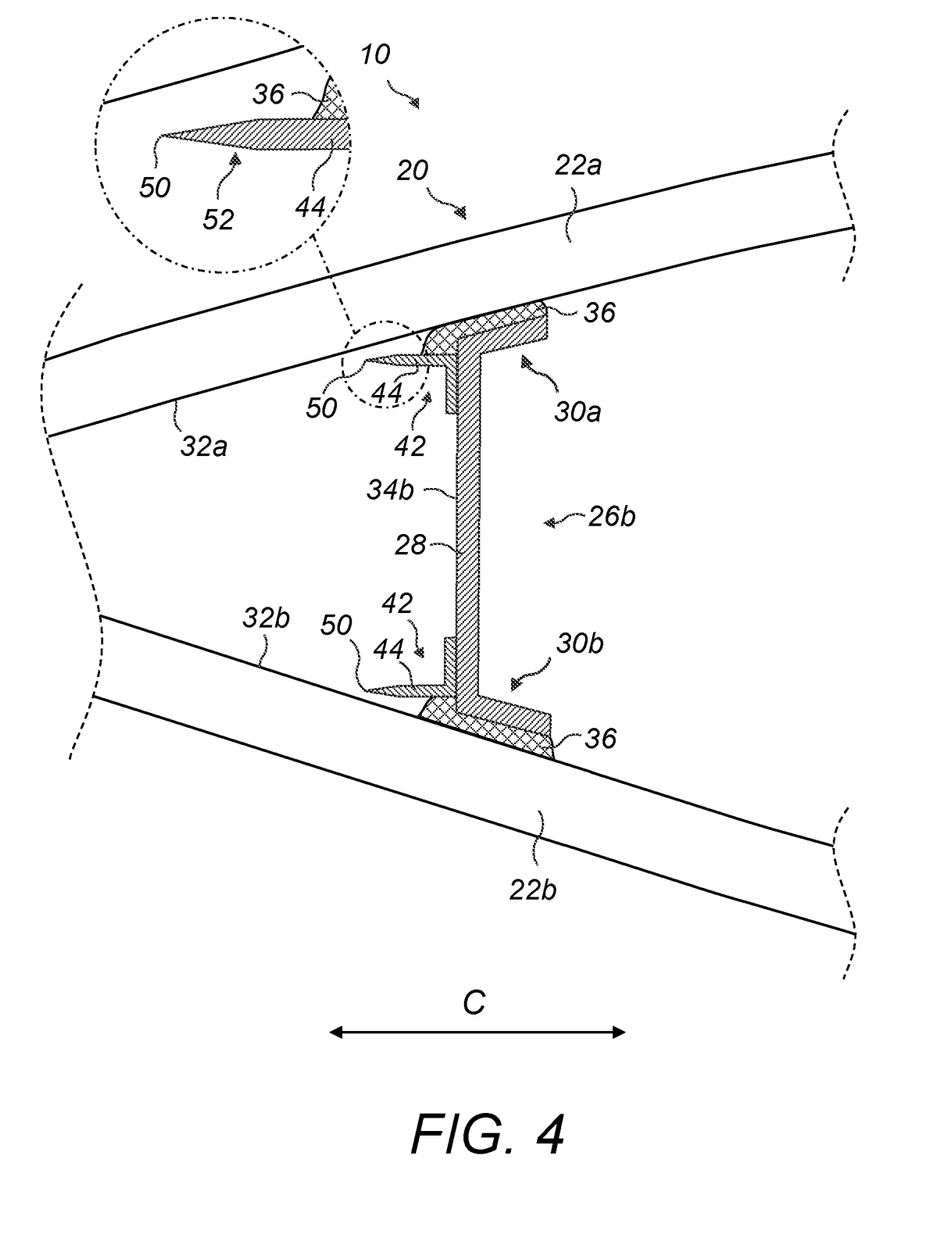
FIG. 4 is a schematic cross-sectional view showing a non-structural flange that tapers in thickness towards a distal edge of the flange.

As described above with reference to FIGS. 2a and 2b, and as shown in FIG. 3, the adhesive-receiving portion 44 of the non-structural flange 42 may be substantially parallel to the inner surface 32 of the shell 20 when viewed in cross section. The inclination of the adhesive-receiving portion 44 relative to the web panel 28 may vary along the length of the web 26 to maintain a consistent spacing between the non-structural flange 42 and shell 20 in accordance with variations in the inclination of the inner surface 32. However, this is not necessarily the case for all non-structural flanges 42. For example, the inclination of the adhesive receiving portion 44 relative to the web panel 28 may be substantially constant along the length of the web 26, i.e. the non-structural flange 44 may have a substantially constant cross-sectional profile along its length. As such, where the inclination of the inner surface 32 relative to the web panel 28 varies along the length of the web 26, the adhesive-receiving portion 44 may not be parallel to that inner surface 3 in some spanwise portions of the blade 10, as shown in FIG. 4.

The adhesive-receiving portion 44 of the non-structural flange 42 may be inclined at an angle that substantially matches an average inclination of the inner surface 32 relative to the web panel 28 along the length of the flange 42. As such, the adhesive-receiving portion 44 may be inclined at a "best fit" angle relative to the web panel 28. This may facilitate the use of a single standard part which makes the assembly of the non-structural flange 42 with the web 26 a relatively straightforward process, and also means that the flanges 42 can be mass or batch produced in a cost-effective manner. Whilst the adhesive-receiving portion 44 in FIG. 4 is oriented substantially perpendicular to the second side 34b of the shear web panel 28, it will be appreciated that the adhesive-receiving portion 44 may be orientated at any suitable inclination.

Preferably, the distal edge 50 of the non-structural flange 42 may be substantially aligned with a plane of the corresponding load-bearing flange 30. The distal edge 50 of the non-structural flange 42 may therefore be in close proximity to, or light contact with, the inner surface 32 of the shell 20 when the web 26 is sandwiched between the half shells 22a, 22b during the join-up process. This may help to contain squeezed adhesive 36 on the non-structural flange 42. The distal flange non-structural flange 42 may additionally comprise an inclined distal flange tip 52 (see FIG. 3) to further contain the adhesive 36 as previously described.

It is particularly beneficial for the non-structural flange 42 to have some degree of flexibility in examples where the non-structural flange 42 has a substantially constant cross-sectional profile along its length. This may allow the adhesive-receiving portion 44 to adapt its inclination to the varying inclination of the inner surface 32 of the shell 20 along the length of the web 26. As such, the flexible flange 42 and shear web 26 are not damaged when the non-structural flange 42 comes into contact with the inner surface 32 of the shell 20. Increased flange flexibility may be achieved as previously described by tapering the thickness of the flange 42 towards the distal edge 50, and/or by forming the non-structural flange 42 of a flexible material and/or by configuring the geometry of the corner between the adhesive-receiving portion 44 and flange stem 46 to act as a hinge as described above.

Figure 5A:
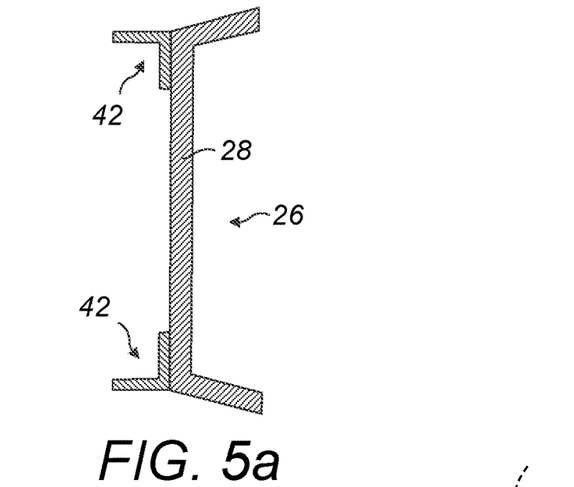
FIG. 5a is a schematic cross-sectional view of a plurality of flexible non-structural flanges connected to a shear web before being arranged in the blade.
Figure 5B:
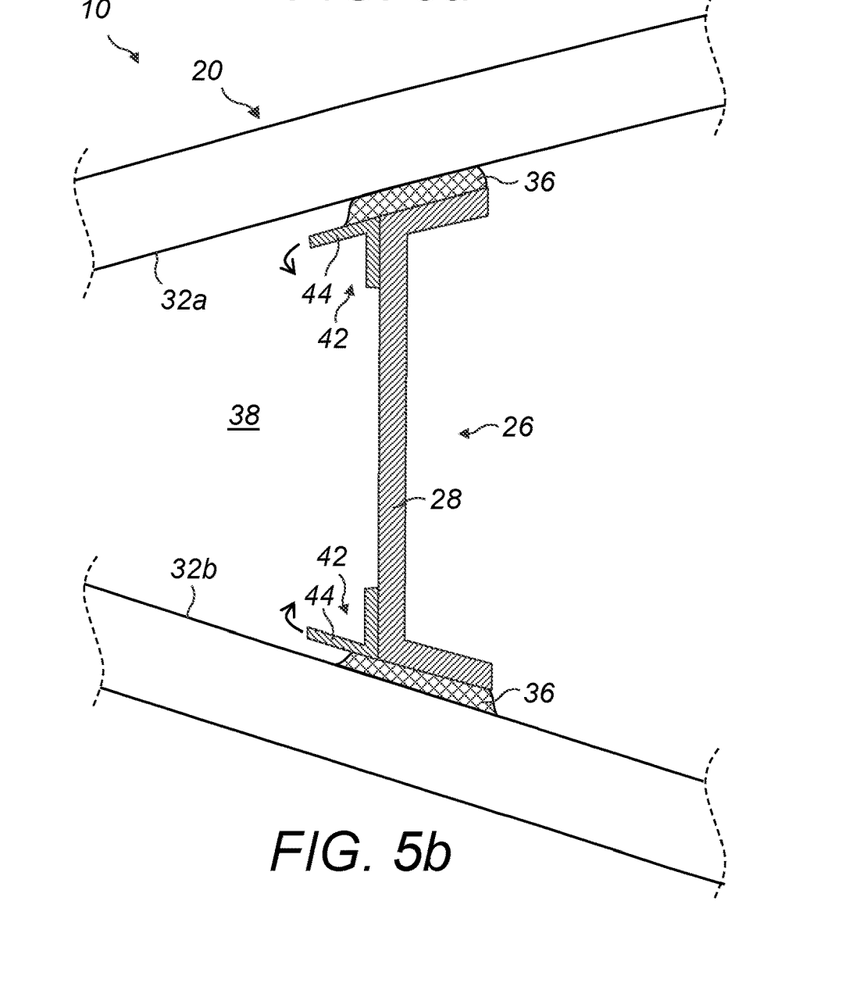
FIG. 5b is a schematic cross-sectional view of the blade with flexible non-structural flanges arranged in opposed relation to inner surfaces of the shell.

The non-structural flange 42 shown in the cross-sectional views of FIGS. 5a and 5b is deliberately configured to contact the inner surface 32 of the shell 20 during the join-up process. FIG. 5a shows the non-structural flanges 42 connected to the shear web 26 and in a neutral state before the web 26 is arranged inside the shell 20. FIG. 5b shows the web 26 and non-structural flanges 42 inside the shell 20 following the join-up process.

With reference to both FIGS. 5a and 5b, the non-structural flange 42 may be configured to deflect substantially during the join-up process. Contact between the inner surface 32 of the shell 20 and the adhesive-receiving portion 44 of the non-structural flange 42 causes the adhesive-receiving portion 44 to deflect towards the interior 38 of the blade 10. The adhesive-receiving portion 44 pivots relative to the shear web panel 28 to conform to the inclination of the inner surface 32 of the shell 20. The non-structural flange 42 may have a substantially constant cross-sectional profile along its length because the deflection of the adhesive-receiving portion 44 can ensure that contact with the shell 20 does not damage the non-structural flange 42.

The non-structural flange 42 in such an example is preferably formed of a sufficiently flexible material to allow the adhesive-receiving portion 44 to deflect upon contact with the shell 20. In some examples, the adhesive-receiving portion 44 may deflect towards the blade interior 38 due to counterpressure from excess squeezed adhesive 36 between the adhesive-receiving portion 44 the inner surface 32 of the shell 20. The non-structural flange 42 may therefore deflect without direct contact between the shell 20 and adhesive-receiving portion 44 in some examples.

Figure 6A:
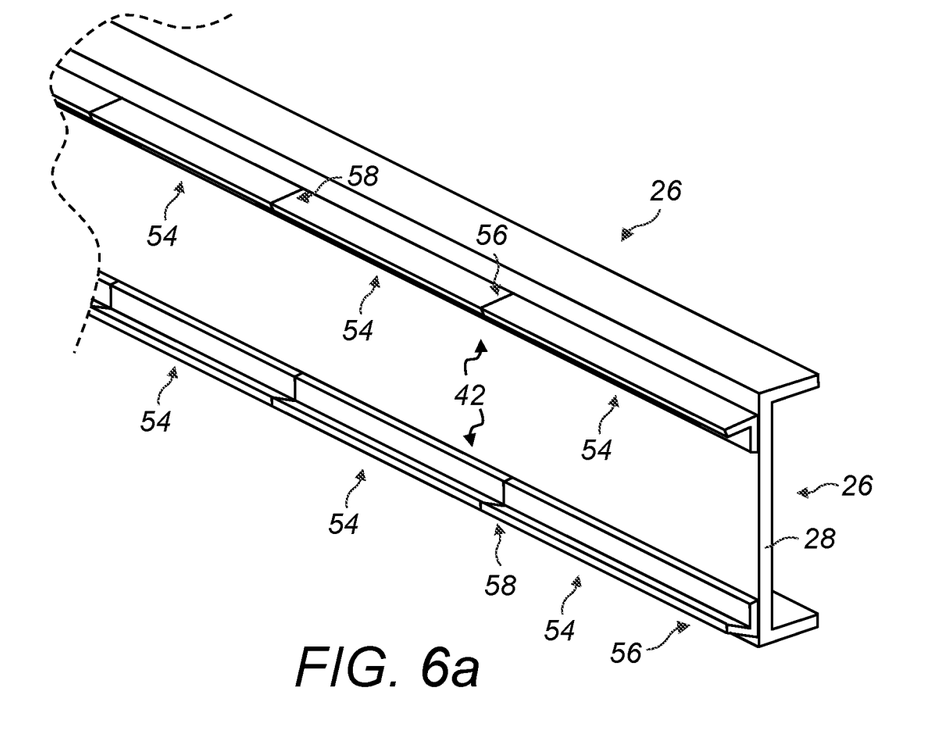
FIG. 6a is a schematic perspective view of a shear web and non-structural flanges formed of a plurality of longitudinal flange sections arranged end to end along the web.

With reference now to FIG. 6a, the non-structural flange 42 may be formed of a plurality of longitudinal flange sections 54. In such an example, the flange sections 54 are preferably arranged end-to-end along the length of the shear web 26. Longitudinally adjacent flange sections 54 are preferably butted up against one another to ensure that surplus squeezed adhesive 36 is contained on the adhesive-receiving portion 44 of the flange 42 and does not fall through a gap between flange sections 54. As shown in FIG. 6a, the flange sections 54 may have substantially the same cross-sectional profile in some examples.

Figure 6B:
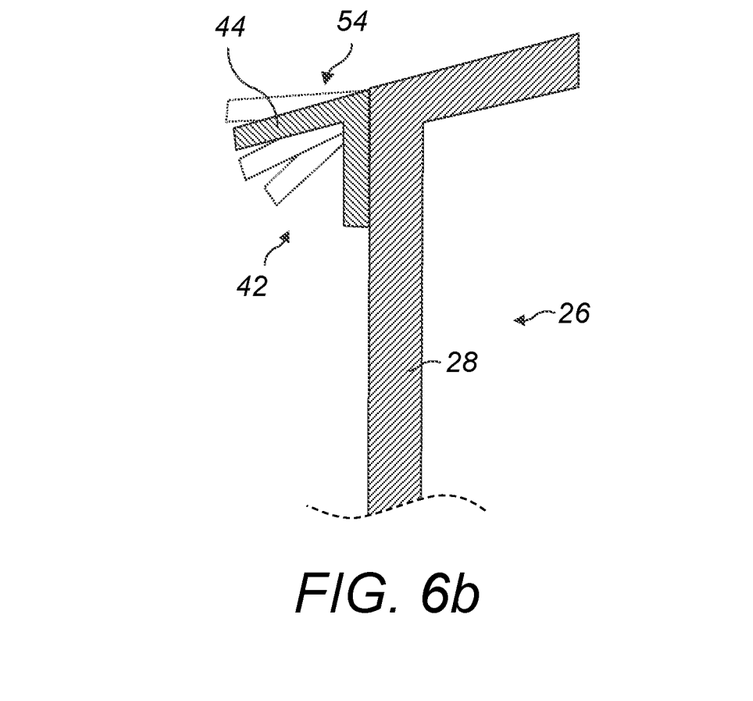
FIG. 6b is a schematic cross-sectional view showing a non-structural flange and indicating a plurality of adhesive receiving portions at different inclinations.

Alternatively, the flange sections 54 may have different cross-sectional profiles in accordance with their respective locations along length of the shear web 26. For example, the dashed outlines in FIG. 6b show different inclinations of the adhesive-receiving portions 44 of flange sections 54 relative to the shear web panel 28. Further, each individual flange section 54 may have a substantially constant cross-sectional profile from a first end 56 of the respective flange section 54 to a second end 58. The cross-sectional profile of each longitudinal flange section 54 may be configured in accordance with the inclination of a corresponding portion of the inner surface 32 of the shell 20 relative to the web panel 28. Accordingly, in some examples, longitudinally adjacent flange sections 54 may comprise different cross-sectional profiles. The cross-sectional profile of the non-structural flange 42 may therefore vary in a stepwise manner along the length of the shear web 26.

Figure 7:
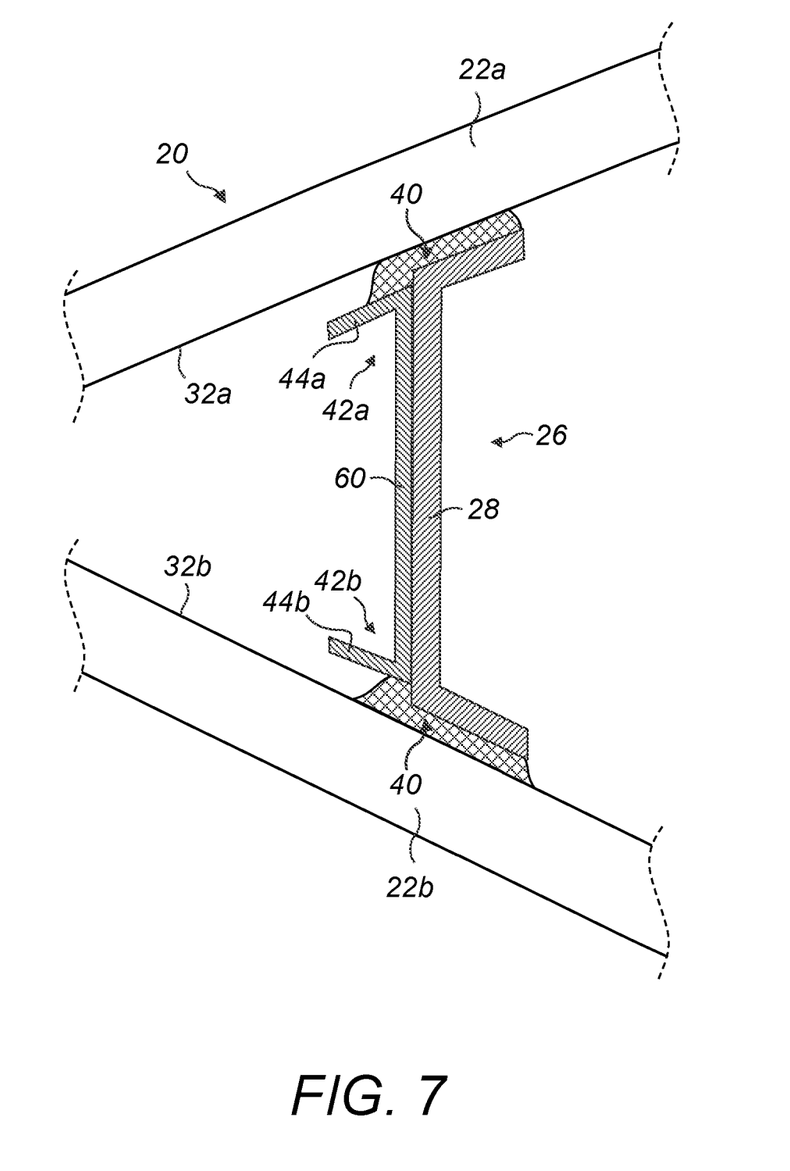
FIG. 7 is a schematic cross-sectional view of a shear web to which a first and second non-structural flange are connected via a shared flange stem.

In some examples, the wind turbine blade 10 may comprise a first and second non-structural flange 42a, 42b that share a common flange stem 60 as shown in FIG. 7. The first and second non-structural flanges 42a, 42b are essentially combined into a single part with a common flange stem 60 in such an example. As such, the adhesive-receiving portions 44a, 44b of the first and second non-structural flanges 42a, 42b extend transversely from the same shared flange stem 60. The adhesive-receiving portions 44a, 44b are configured for arrangement in opposed relation to each of the windward and leeward inner surfaces 32a, 32b of the shell 20.

The shared flange stem 60 provides a single connection point for connecting both adhesive-receiving portions 44a, 44b to the shear web 26. The shared stem 60 may be connected to the shear web 26 by adhesive, such as a liquid adhesive or an adhesive tape for example. In other examples the shared stem 60 may be connected to the shear web 26 with a bolted connection (not shown). Preferably, any holes provided in the web panel 28 are spaced as far as possible from the heel portion 40 of the web 26 to minimise the risk of stress concentrations forming in high load areas in use. Providing both adhesive-receiving portions 44 on a single component is therefore particularly beneficial in examples where the non-structural flange 42 is arranged near the tip end 14 of the blade 10, where the web panel 28 decreases in height, because the bolted connection can be made through the middle of the shear web panel 28, sufficiently far from the heel portions 40 of the shear web 26.

A number of additional features may be applicable to any of the examples described above. For example, the adhesive-receiving portion 44 of the non-structural flange 42 may comprise a rough or uneven surface texture, i.e. the surface of the adhesive-receiving portion 44 may not be smooth. This may help to promote adhesion between the adhesive-receiving portion 44 and any adhesive 36 received thereon. Further, once the adhesive 36 has cured, the rough surface texture may help to ensure that the surplus squeezed adhesive 36 situated on the adhesive-receiving portion 44 remains adhered and does not come loose when the blade 10 is in use.

The non-structural return flange 42 may be formed of a material that is at least partially transparent or translucent in some examples. This facilitates visual inspection of the surplus squeezed adhesive 36 contained on the non-structural flange 42 from within the blade interior 38. As such, it may be possible to determine whether the web 26 has been thoroughly bonded to the shell 20 during the join-up process such that surplus adhesive 36 is squeezed onto the non-structural flange 42. This may make it possible to confirm that there is adhesive 36 present between the shell 20 and the heel portion 40 of the web 26 by means of a visual inspection. Visual inspection may be significantly easier and less time consuming than non-destructive testing such as ultrasonic scanning. As such, a blade manufacturing facility may manage a higher throughput of blades 10 if the reliance on non-destructive testing can be reduced by facilitating visual inspection instead.

Whilst the non-structural flange 42 has been described with reference to the example of FIG. 2a as being spaced at a greater distance from the inner surface 32 of the shell 20 than the distance between the corresponding load-bearing flange 30 and inner surface 32, the adhesive-receiving portion 44 of the non-structural flange 42 may alternatively be substantially co-planar with the load-bearing flange 30 in other examples. In particular, the adhesive-receiving portion 44 may be substantially co-planar with the load-bearing flange 30 in examples where the adhesive-receiving portion 44 pivots relative to the shear web panel 28 to conform to the inclination of the shell inner surface 32 during the join-up process. For example, the adhesive-receiving portions 44 of the non-structural flanges 42 shown in FIG. 5b are substantially co-planar with the load-bearing flanges 30 after the shear web 26 is sandwiched between the half shells 22a, 22b.

In some examples, the non-structural flange 42 may be formed of a single part and may have a varying cross-sectional profile. For example, the inclination of the adhesive-receiving portion 44 relative to the web panel 28 may vary between a first end of the flange 42 and a second end of the flange 42. In such an example, the adhesive-receiving portion 44 may define a substantially uninterrupted surface along the length of the flange 42 despite the cross-sectional profile of the flange varying. Where the non-structural flange 42 is formed of a plurality of longitudinal flange sections 54, the flange sections 54 may each comprise a varying cross-sectional profile. The inclination of the adhesive-receiving portion 44 of a given flange section 54 may therefore vary relative to the web panel 28 between the first end 56 of the flange section 54 and the second end 58 of the flange section 54.

The shear web 26 may be a composite part formed by integrating the web panel 28 and load-bearing flanges 30 with resin and fibrous material. Alternatively, the shear web panel 28 and load-bearing flanges 30 may be formed as separate parts before being fixed together to form the shear web 26. Preferably, when manufacturing the blade 10, the shear web 26 is arranged as a single part, for example as a sub-assembly or as a single integrated part.

In some examples (not depicted in the accompanying figures), the distal edge 50 of the non-structural flange 42 may be spaced further apart from the inner surface 32 of the shell 20 than the proximal edge 48 of the flange 42. The proximal edge 48 of the non-structural flange 42 is unlikely to come into contact with the shell 20 during the join-up process because the proximal edge 48 is in close proximity to the load-bearing flange 30 which would make contact with the shell 20 first. As noted previously, the distal edge 50 of the non-structural flange 42 is most likely to contact the shell 20. As such, spacing the distal edge 50 of the non-structural flange 42 further from the inner surface 32 of the shell 20 than the proximal edge 48 may help to avoid any contact between the shell 20 and distal edge 50 during the join-up process.

The shear web 26 may be connected to the inner surface 32 of the shell 20 by only one load-bearing flange 30 in some examples. Whilst the present invention has been described with reference to a substantially C-shaped shear web 26, it will be appreciated that the non-structural flange 42 may be connected to shear webs 26 having any shape. Preferably, the distal edge 50 of the non-structural flange 42 extends beyond any part of the shear web 26 in the chordwise direction (C) to ensure that adhesive 36 squeezed from between the web 26 and the shell 20 is received on the non-structural flange 42.

In some examples, the blade 10 may comprise only one non-structural flange 42 arranged in opposed relation to one of the windward or leeward inner surfaces 32a, 32b of the shell 20. In such an example, the blade 10 preferably comprises a non-structural flange 42 configured for arrangement with whichever inner surface 32 of the shell 20 is an upper inner surface 32 during the join-up process in order to stop any surplus squeezed adhesive 36 falling on the opposing lower inner surface 32 of the shell 20.

Many modifications may be made to the examples described above without departing from the scope of the present invention as defined in the accompanying claims. It will be appreciated that features described in relation to each of the examples above may be readily combined with features described with reference to any other examples without departing from the scope of the invention as defined by the following claims.

The invention claimed is:

1. A wind turbine blade, comprising:
a shell,
a shear web connected between a windward inner surface of the shell and a leeward inner surface of the shell, the shear web comprising:
an elongate web panel, and
a load-bearing flange extending transversely from a first side of the web panel to connect the shear web to the windward or leeward inner surface of the shell, and
at least one non-structural flange extending transversely from a second side of the web panel, the non-structural flange having a planar adhesive-receiving portion arranged in opposed relation to the windward or leeward inner surface of the shell,
wherein the load-bearing flange and the non-structural flange are formed of different materials, and
wherein the non-structural flange is formed of a plurality of longitudinal flange sections arranged end to end along the length of the shear web.

2. The wind turbine blade of claim 1, wherein the load-bearing flange comprises reinforcing fibres.

3. The wind turbine blade of claim 1, wherein the non-structural flange does not comprise reinforcing fibres.

4. The wind turbine blade of claim 1, wherein the adhesive-receiving portion of the non-structural flange has a width of at least 12.5 mm.

5. The wind turbine blade of claim 1, wherein a proximal edge of the non-structural flange is connected to the web panel.

6. The wind turbine blade of claim 1, wherein the non-structural flange comprises a distal flange tip that tapers in thickness.

7. The wind turbine blade of claim 1, wherein the non-structural flange comprises a distal flange tip that is inclined relative to the adhesive-receiving portion.

8. The wind turbine blade of claim 1, wherein the load-bearing flange is integral with the web panel.

9. The wind turbine blade of claim 1, wherein the non-structural flange is non-integral with the web panel.

10. The wind turbine blade of claim 1, wherein the non-structural flange is at least partially transparent or translucent.

11. The wind turbine blade of claim 1, wherein the adhesive-receiving portion of the non-structural flange is spaced apart from the windward or leeward inner surface of the shell by a greater distance than a distance between the load-bearing flange and the same windward or leeward inner surface of the shell.

12. The wind turbine blade of claim 1, wherein the adhesive-receiving portion of the non-structural flange is co-planar with the load-bearing flange.

13. The wind turbine blade of claim 1, wherein the non-structural flange is formed of a flexible material.

14. The wind turbine blade of claim 1, wherein a cross-sectional profile of the non-structural flange varies along the length of the shear web.

* * * * *